United States Patent [19]
Vermeulen

[11] 3,982,783
[45] Sept. 28, 1976

[54] SLIDING ROOF ASSEMBLY FOR VEHICLES AND METHOD OF MOUNTING SAME

[76] Inventor: Theodorus Hendricus Vermeulen, Richard Holplein 8, Heemstede, Netherlands

[22] Filed: Dec. 24, 1974

[21] Appl. No.: 536,308

[30] Foreign Application Priority Data
Jan. 2, 1974 Netherlands .................... 7400008

[52] U.S. Cl. .............................. 296/137 E; 49/380
[51] Int. Cl.$^2$ .................................... B60J 7/04
[58] Field of Search ......... 296/137 E, 137 F, 137 B, 296/137 A, 137 R, 137 D, 137 G, 137 H, 137 C; 49/380, 504

[56] References Cited
UNITED STATES PATENTS

| | | | |
|---|---|---|---|
| 2,272,535 | 2/1942 | Votypka | 296/137 F |
| 3,016,263 | 1/1962 | Rehmann | 296/137 E |
| 3,066,975 | 12/1962 | Larche | 296/137 E |
| 3,555,736 | 1/1971 | Koch, Jr. et al. | 49/504 |

FOREIGN PATENTS OR APPLICATIONS

| | | | |
|---|---|---|---|
| 264,667 | 9/1963 | Australia | 296/137 H |
| 1,205,849 | 11/1965 | Germany | 296/137 E |
| 640,532 | 11/1937 | Germany | 296/137 E |
| 1,131,051 | 10/1968 | United Kingdom | 296/137 E |
| 1,093,026 | 11/1967 | United Kingdom | 296/137 E |

*Primary Examiner*—L. J. Paperner
*Assistant Examiner*—Donald W. Underwood
*Attorney, Agent, or Firm*—Haseltine, Lake & Waters

[57] ABSTRACT

A sliding roof assembly for vehicles comprising a frame, a roof member slidably mounted in said frame and a covering panel mounted on said frame and provided with a substantially rectangular aperture in its front portion of substantially the same size as the roof member and a rear portion which covers the roof member when the latter is moved rearwardly to uncover said aperture, said panel being provided with a peripheral supporting rim which projects outwardly from the frame and which is adapted to rest on the vehicle roof. A method of mounting this sliding roof assembly in a motor vehicle, comprising the steps of forming an aperture in the vehicle roof of substantially the same dimensions as the frame, inserting into the aperture from above the sliding roof assembly in such manner that the supporting rim of the covering panel rests on said vehicle roof around the aperture and then connecting the covering panel to the vehicle roof.

21 Claims, 4 Drawing Figures

SLIDING ROOF ASSEMBLY FOR VEHICLES AND METHOD OF MOUNTING SAME

BACKGROUND OF THE INVENTION

The invention relates to a sliding roof assembly for vehicles and method of mounting same.

It is to be understood that throughout the following specification such terms as "upper", "lower", "vertical", "horizontal", "front" and "rear" are employed only for convenience of identification of the sliding roof assembly relative to its normal position of use on a vehicle.

Until now a specialized workshop has been needed for the purpose of subsequently providing a motor vehicle with a sliding roof which had initially been constructed without such a roof in the manufacturer's works. The fitting of a sliding roof into a motor vehicle commonly requires operations of such complex nature that such operations can only be undertaken by personnel specializing in this work.

In a known process for the production of a sliding roof in a motor vehicle, a substantially rectangular opening of the size of the sliding roof member is initially formed in the vehicle roof and a frame for the sliding roof member which closes off the excised opening in the closed position is then mounted on the vehicle roof from below, for which purpose the rim of the vehicle roof surrounding the roof opening is swaged over around a horizontal upper flange of the frame. The sliding roof member is then inserted into the frame and the whole is precisely adjusted. The entire vehicle roof must thereafter be rubbed down and resprayed.

SUMMARY OF THE INVENTION

The object of the present invention is to provide a sliding roof assembly for vehicles such that its installation in a vehicle may easily be performed even by untrained or semi-skilled personnel.

The present invention consists in a sliding roof assembly for vehicles comprising a frame, a roof member slidably mounted in said frame and a covering panel mounted on said frame and provided with a substantially rectangular aperture in its front portion of substantially the same size as the roof member and a rear portion which covers the roof member when the latter is moved rearwardly to uncover said aperture, said panel being provided with a peripheral supporting rim which projects outwardly from the frame and which is adapted to rest on the vehicle roof.

The invention also consists in a method of mounting a sliding roof assembly as referred to above in a motor vehicle comprising the steps of forming an aperture in the vehicle roof of substantially the same dimensions as the frame, inserting into the aperture from above the sliding roof assembly in such manner that the supporting rim of the covering panel rests on said vehicle roof around the aperture and then connecting the covering panel to the vehicle roof.

The assembly comprising the frame, the sliding roof member and the covering panel is preferably assembled at the works and, in doing so, the sliding roof member is precisely adjusted in position within the frame. The operations remaining to be performed for installing this assembly in a vehicle are so simple that they may also be undertaken without any difficulty by untrained personnel. The fitting of the assembly as a unit into the vehicle roof from above through the aperture does not raise any technical difficulties, whilst any damage to the vehicle roof along the edge of the aperture is covered by means of the supporting rim of the covering panel, so that a respraying operation on the vehicle roof is no longer necessary.

DESCRIPTION OF A PREFERRED EMBODIMENT

Figure 1:
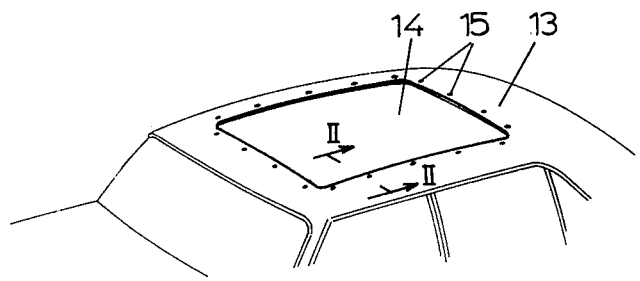
FIG. 1 is a perspective view of a vehicle roof prepared for the mounting of a sliding roof assembly according to the present invention.

In order to provide a vehicle with a sliding roof, use is made of a structure 1, already assembled at the works, comprising a sliding roof 3 which is assembled and slidably mounted in a frame 2, the latter having a covering panel 4 mounted thereon. The covering panel 4 has a rectangular aperture 5 in its front portion of a size corresponding to the dimensions of the sliding roof 3, so that the aperture is closable by the sliding roof 3. The covering panel 4 is connected to the frame 2 by swaging its rim surrounding the aperture 5 around the horizontal top flange 2' of the frame 2.

To the rear of the aperture 5, the panel 4 has a portion 6 under which the sliding roof 3 is postioned when it is moved rearwardly to uncover the aperture 5. The panel 4 has a peripheral supporting rim 7 extending around the frame 2 which projects outwardly from same. This supporting rim 7 is provided with fastening bolts 8 which extend downwardly at right angles and are evenly spaced around the entire supporting rim. Carrying arms or brackets 9 are fastened on the outer surface of a vertical portion 2'' of the frame 2 and/or on the underside of the supporting rim 7 of the panel 4, each of the brackets having an opening through which a bolt 8 extends, the bolt head 8' being positioned within a gap formed between the carrying bracket 9 and the supporting rim 7. Each bolt is non-rotatably connected to the carrying bracket 9.

On the underside of an inwardly extending and generally horizontal bottom flange 2''' of the frame 2 is positioned a lining 10 with a resilient packing 11 positioned between the bottom flange 2''' and the lining 10. The bottom flange 2''' of the frame 2 is bent upwardly at right angles adjacent its inner edge and then inwardly at right angles to form a step, as apparent from FIGS. 2 and 4. The lining 10 has its outer edge glued to the vertical frame portion 2'' of the frame 2, whilst its inner edge is glued on the upper side of the inwardly extending extremity of the bottom flange 2'''. The lining 10 may be of a different colour from that of the roof lining 12, i.e. perferably in a shade providing a strong contrast with the colour of the roof lining 12.

Prior to installing this sliding roof assembly 1 into a motor vehicle, a rectangular aperture 14 is formed in the roof 13 of the motor vehicle. This aperture 14 is so dimensioned that the frame 2 and associated sliding roof 3 can be inserted from above into the aperture 14 with the supporting rim 7 of the covering panel 4 resting on the vehicle roof 13 around the periphery of the aperture 14.

Holes 15 through which the fastening bolts 8 are passed upon insertion of the sliding roof assembly 1 are drilled in the vehicle roof 13 around the aperture 14. The aperture 14, together with the holes 15, are preferably traced on to the vehicle roof 13 by means of a templet, so that the neat and precise excision of the aperture 14, as well as the required spacing of the holes 15 is ensured.

Figure 2:
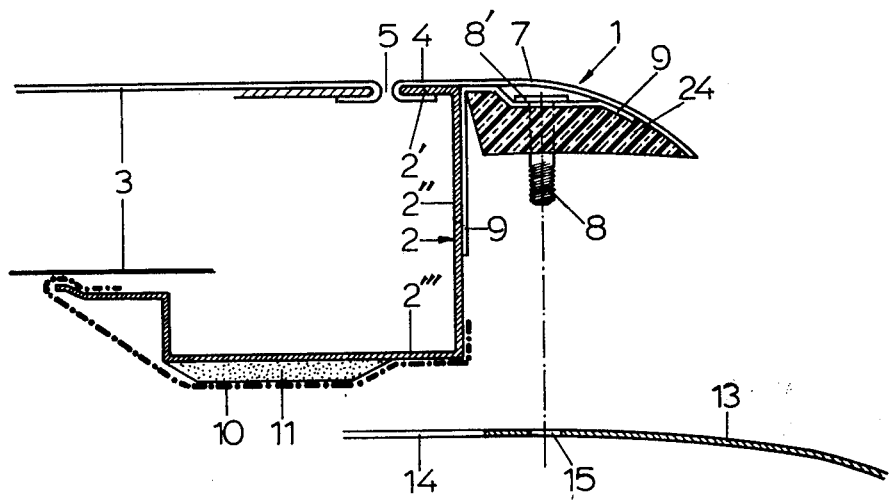
FIG. 2 is a vertical cross-section on an enlarged scale, taken on the line II—II of FIG. 1 and showing the sliding roof assembly of the present invention prior to being mounted in the vehicle roof.
Figure 2:
Figure 3:
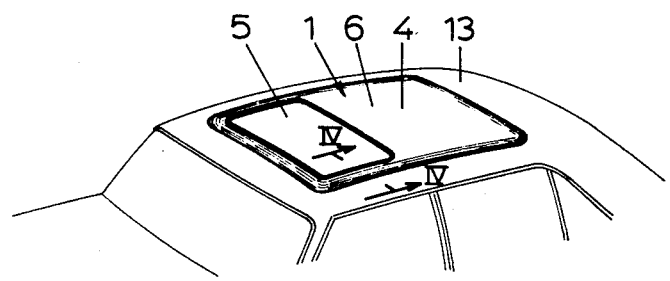
FIG. 3 is a view similar to FIG. 1 of the vehicle roof after mounting of the sliding roof assembly.

After the aperture 14 has been formed in the vehicle roof 13, an at least approximately rectangular opening 16 is cut from the roof lining 12, the longitudinal and transverse dimensions of which are somewhat smaller than the corresponding dimensions of the aperture 14, as will be apparent from FIG. 2.

A web of a reinforcing section 17 bears against the underside of the vehicle roof 13 and has an opening therethrough for the passage of a bolt 8, on to which is then fixed from below a nut 19. The reinforcing section 17 is of U-shaped cross-section and in the form of a rectangular frame appropriate to the size of the aperture 14.

Brackets 18 are suspended from at least some of the bolts 8, below the reinforcing section 17. Each bracket 18 has a horizontal upper flange with an aperture therethrough for the passage of a bolt 8. Nuts 19 are then screwed on to the bolts 8, as shown in FIG. 4.

After the fastening of the assembly 1 on the vehicle roof 13 has been completed, the inner edge of the roof lining 12 bordering its opening 16 is glued around the opening onto the underside of the lining 10 on the bottom flange 2''' of the frame 2.

The joint between the roof lining 12 and the lining 10 is then covered from below by a covering strip 20. To effect this, the horizontal bottom flanges of the brackets 18 are provided with openings 21 into which snap-in elements 22 mounted on the covering strip 20 are engaged by pressure from below. The covering strip 20 has a lining 23, preferably of the same colour as the lining 10, so that these two linings are colour-matched but contrast with the remainder of the roof lining. To simplify the assembly, the covering strip 20 is also in the form of a rectangular frame, so that it may be secured as a unit in an easy and convenient manner from below by means of the snap-in elements 22.

Figure 4:
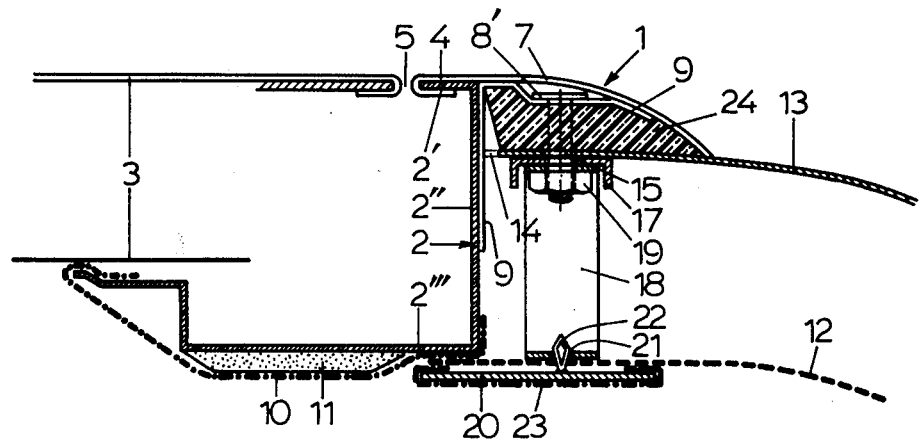
FIG. 4 is a cross-section taken on the line IV—IV of FIG. 3.

As shown by FIGS. 2 and 4, the supporting rim 7 of the panel 4 has a greater curvature, in cross-section, than the vehicle roof 13 at this point, the gap between these two being filled by a filler member 24 comprising a material which deforms uniformly under pressure, so that the member 24 moulds itself to the shape of the vehicle roof 13 upon the nuts 19 being tightened for the purpose of connecting the panel 4 to the vehicle roof 13. The member 24 is also sealed with respect to the vehicle roof 13 by means of a suitable sealer "putty". The member 24 also has passages for the bolts 8.

To render unnecessary the respraying of the vehicle roof 13 after the fitting operation, the panel 4 and the upper surface of the sliding roof 3 are sprayed in a shade which differs from, and preferably contrasts, with the vehicle roof 13.

The mounting of the panel 4 on the roof 13 of the vehicle may be effected by spot welding or rivetting, instead of the fastening bolts 8 referred to.

The present invention offers, for the first time, the possibility of equipping vehicles with sliding roofs, without having to find a specialist business for this purpose. Thus, it is possible for any workmanlike amateur to provide his vehicle with a perfectly functioning sliding roof.

The invention is not limited to the example of embodiment shown in the drawings, but may be modified in various ways within the scope of the appended claims.

I claim:

1. A sliding roof assembly for vehicles comprising a frame, a roof member slidably mounted in said frame, a covering panel mounted on said frame and having a substantially rectangular aperture in its front portion of substantially the same size as the roof member, said covering panel having a rear portion covering the roof member when the latter is moved rearwardly to uncover said aperture, said panel having a peripheral supporting rim projecting outwardly from the frame and adapted to rest on the vehicle roof, a lining attached to the underside of an inwardly directed, generally horizontal bottom flange of the frame, said bottom flange being bent upwardly at its inner edge and then extends inwards horizontally to form a step, the outer edge of said lining being secured to an external surface of a vertical frame portion, the inner edge of said lining being secured to the upper surface of the inwardly extending inner edge of the bottom flange.

2. A sliding roof assembly according to claim 1, wherein a resilient filler is positioned between the bottom flange and the lining.

3. A sliding roof assembly according to claim 2, wherein the lining, during use, is of a color different from that of the vehicle roof lining.

4. A sliding roof assembly according to claim 1, including brackets mounted on the outer surface of the vertical portion of the frame, the fastening bolts having heads positioned between said brackets and the supporting rim.

5. A sliding roof assembly according to claim 4, wherein the heads of the individual fastening bolts are non-rotatably connected to the respective brackets.

6. A sliding roof assembly according to claim 1, wherein the frame has a horizontal top flange, the covering panel being swaged over the horizontal top flange of the frame along its edge surrounding said opening.

7. A sliding roof assembly according to claim 1, wherein the supporting rim of the covering panel is curved downwardly, and including a filler member positioned in the curvature formed thereby.

8. A sliding roof assembly according to claim 7, wherein said filler member is provided with bores accomodating the fastening bolts.

9. A sliding roof according to claim 1, wherein the supporting rim of said covering panel is connected to the vehicle roof by welding or riveting.

10. A vehicle provided with a sliding roof assembly, said sliding roof assembly comprising a frame, a roof member slidably mounted in said frame, a covering panel mounted on said frame and having a substantially rectangular aperture in its front portion of substantially the same size as the roof member, said covering panel having a rear portion covering the roof member when the latter is moved rearwardly to uncover said aperture, said panel having a peripheral supporting rim projecting outwardly from the frame, the vehicle comprising an aperture in its roof of substantially the same dimensions as the frame, the sliding roof assembly being inserted into the roof aperture so that the supporting rim of the covering panel rests on said vehicle roof around the roof aperture, said covering panel being connected to the vehicle roof, the vehicle roof including a roof lining, a substantially rectangular opening of smaller dimensions than the roof aperture being cut out of the roof lining, the inner edge of the roof lining overlapping the roof aperture and being glued from below on to the underside of a roof lining extending around the periphery of the horizontal bottom flange of the frame, a strip covering the joint between the roof lining and the lining covering the bottom flange, brackets suspended from at least some fastening bolts, the covering strip having snap-in elements pressed into holes in a horizontal bottom flange of the brackets.

11. A vehicle according to claim 10, wherein holes are formed in the vehicle roof around the roof aperture receiving fastening bolts extending downwardly from the supporting rim of the covering panel, and including nuts screwed from below onto said bolts.

12. A vehicle according to claim 10, wherein the supporting rim of the covering panel is of greater curvature than the vehicle roof at the point of contact, and including a filler element positioned in the gap between said supporting rim and the vehicle roof.

13. A vehicle according to claim 12, wherein holes are formed in the filler element and in a reinforcing section which are aligned with the holes in the roof surrounding said roof aperture, said fastening bolts passing through the filler element and the reinforcing section.

14. A vehicle with a sliding roof assembly, comprising a frame, a roof member slidably mounted in said frame, a covering panel mounted on said frame and having a substantially rectangular aperture in its front portion of substantially the same size as the roof member, said covering panel having a rear portion covering the roof member when the latter is moved rearwardly to uncover said aperture, said panel having a peripheral supporting rim projecting outwardly from the frame, said supporting rim of the covering panel resting on the vehicle roof, the covering panel being connected to said vehicle roof, a lining attached to the underside of an inwardly directed, substantially horizontal bottom flange of the frame, said bottom flange being bent upwardly at its inner edge and then extending inwards horizontally to form a step, the outer edge of the lining being secured to an external surface of a vertical frame portion, the inner edge of said lining being secured to the upper surface of the inwardly extending inner edge of the bottom flange, and a resilient filler positioned between the bottom flange and the lining, said lining being of a color different from that of the vehicle roof lining.

15. A sliding roof assembly for vehicles comprising a frame, a roof member slidably mounted in said frame, a covering panel mounted on said frame and having a substantially rectangular aperture in its front portion of substantially the same size as the roof member, said covering panel having a rear portion covering the roof member when the latter is moved rearwardly to uncover said aperture, said panel having a peripheral supporting rim projecting outwardly from the frame and adapted to rest on the vehicle roof, a plurality of spaced, downwardly extending fastening bolts being mounted non-rotatably on the supporting rim of said covering panel, a lining being attached to the underside of an inwardly directed, generally horizontal bottom flange of the frame, said bottom flange being bent upwardly at its inner edge and then extending inwards horizontally to form a step, the outer edge of said lining being secured to an external surface of a vertical frame portion, the inner edge of said lining being secured to the upper surface of the inwardly extending inner edge of the bottom flange.

16. A sliding roof assembly according to claim 15, wherein a resilient filler is positioned between the bottom flange and the lining.

17. A sliding roof assembly according to claim 16, wherein the lining, during use, is of a color different from that of the vehicle roof lining.

18. A sliding roof assembly according to claim 15, including brackets mounted on the outer surface of the vertical portion of the frame, the fastening bolts having heads positioned between said brackets and the supporting rim.

19. A sliding roof assembly according to claim 18, wherein the heads of the individual fastening bolts are non-rotatably connected to the respective brackets.

20. A vehicle provided with a sliding roof assembly, said sliding roof assembly comprising a frame, a roof member slidably mounted in said frame, a covering panel mounted on said frame and having a substantially rectangular aperture in its front portion of substantially the same size as the roof member, said covering panel having a rear portion covering the roof member when the latter is moved rearwardly to uncover said aperture, said panel having a peripheral supporting rim projecting outwardly from the frame, the vehicle comprising an aperture in its roof of substantially the same dimensions as the frame, the sliding roof assembly being inserted into the roof aperture so that the supporting rim of the covering panel rests on said vehicle roof around the roof aperture, holes being formed in the vehicle roof around the roof aperture receiving fastening bolts extending downwardly from the supporting rim of the covering panel, and including nuts screwed from below onto said bolts, a vehicle roof lining, a substantially rectangular opening of smaller dimensions than the roof aperture being cut out of the vehicle roof lining, the inner edge of the vehicle roof lining overlapping the roof aperture and being glued from below on to the underside of a lining extending around the periphery of the horizontal bottom flange of the frame, a strip covering the joint between the roof lining and the lining covering the bottom flange, brackets suspended from at least some of the fastening bolts, the covering strip having snap-in elements pressed into holes in a horizontal bottom flange of the brackets.

21. A vehicle with a sliding roof assembly, comprising a frame, a roof member slidably mounted in said frame, a covering panel mounted on said frame and having a substantially rectangular aperture in its front portion of substantially the same size as the roof member, said covering panel having a rear portion covering the roof member when the latter is moved rearwardly to uncover said aperture, said panel having a peripheral supporting rim projecting outwardly from the frame, said supporting rim of the covering panel resting on the vehicle roof, the covering panel being connected to said vehicle roof, a lining attached to the underside of an inwardly directed, substantially horizontal bottom flange of the frame, said bottom flange being bent upwardly at its inner edge and then extending inwards horizontally to form a step, the outer edge of the lining being secured to an external surface of a vertical frame portion, the inner edge of said lining being secured to the upper surface of the inwardly extending inner edge of the bottom flange, said lining being of a color different from that of the vehicle roof lining.

* * * * *